UNITED STATES PATENT OFFICE.

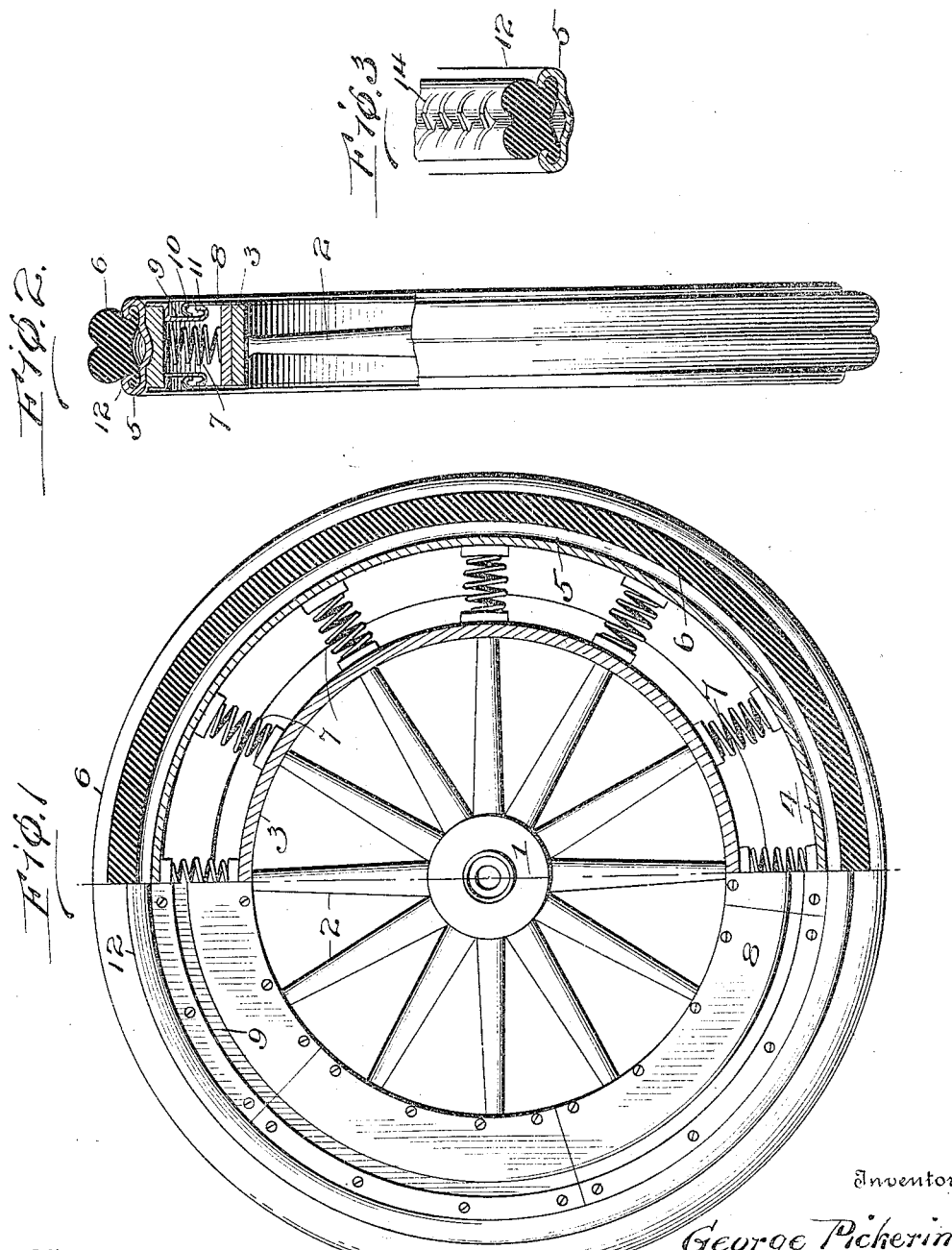

GEORGE PICKERING, OF DOVER, DELAWARE.

WHEEL.

1,223,829.

Specification of Letters Patent. Patented Apr. 24, 1917.

Application filed February 23, 1912. Serial No. 679,412.

*To all whom it may concern:*

Be it known that I, GEORGE PICKERING, a citizen of the United States, residing at Dover, in the county of Kent and State of Delaware, have invented certain new and useful Improvements in Wheels, of which the following is a specification.

This invention relates to the class of wheels with resilient tires, known as spring wheels, and intended to take the place of wheels with pneumatic tires in automobiles and other wheeled vehicles.

The object of the invention is to provide a wheel that is both resilient and durable, and not exposed in use to the frequent accidents that occur to pneumatic tires, and in which, in operation, the springs are relieved of excess of strain from overloading or from inequalities in the roadway.

In the drawings, which accompany this specification and are made a part thereof,—

Figure 1 is a side elevation of the improved wheel with the upper portion in section;

Fig. 2 is a front elevation thereof with the upper portion in section; and,

Fig. 3 is a perspective view of a section of the tire preferably used on the improved wheel.

Like numerals of reference apply to similar parts in all the views shown.

The improved wheel consists of the elements which follow, in form and inter-relation as hereinafter described; a hub 1, spokes 2, an inner felly 3, an outer felly 4 separated from the inner felly, a rim 5 and a tire 6. Radially disposed between the inner felly 3 and the outer felly 4 and opposite the spokes 2 are coil springs 7 bearing at their ends upon the fellies and held in tension by them. Fixedly secured on the inner felly 3 are annular plates 8, which extend outwardly from the felly 3 in the direction of the other felly 4. Secured to the sides of the outer felly 4 adjacent its inner face I provide the annular plates 9. These plates are provided with inwardly offset flanges forming annular shoulders which are designed to abut the inner face of the felly and relieve the fastenings of any strain and also to position the portions of the plates which extend toward the hub inwardly and between the plates 8 hereinbefore referred to. It will thus be seen that the plates 8 overlie the plates 9 as clearly shown in the drawings.

The plates 8 are formed at their outer edges with inwardly recurved flanges 10, and the plates 9 are formed with outwardly recurved flanges 11. The flanges 10 and 11 are normally out of contact but are adapted to interlock when brought in contact at any point on flange 10. The rim 5, formed with clencher flanges 12, is mounted on the outer felly 4 and clenches and carries the tire 6. The tire 6 is made solid, of any approved elastic material, is grooved longitudinally in the center of the tread and is furnished in the tread with transverse webs 14 formed thereon, the contour of the webs 14 making an angle, the apex of which extends beyond the extreme periphery of the tire 6.

It will be seen that the plates 8 and 9 are adapted to move radially upon each other in opposite directions, the movement being limited by the recurved flanges 10 and 11.

When the springs 7 in the lower portion of the wheel are compressed by excessive load or by a shock, the inwardly recurved flange 10 on the plate 8 will interlock with the outwardly recurved flange 11 on the plate 9 at the upper portion of said wheel, arrest the downward movement of that portion of the wheel comprised within the periphery of the inner felly 3, and prevent any additional compression of the springs 7, thereby accomplishing a desirable result, as when the hub of a wheel, as in the case of many spring wheels is forced by compression of the lower springs very considerably below the center, resistance to traction is materially increased. The angular contour of the faces of the transverse webs tends to prevent or minimize skidding, and gives the tire a better grip for purposes of traction.

In operation, when a vehicle equipped with the improved wheel is under traction, shocks or jars from irregularities of surface that are transmitted beyond the rubber tire are for the most part taken up by the springs 7 located between the inner felly 3 and the outer felly 4, and separating the wheel into two portions the outer one of which has a radial movement under spring tension, which movement is limited by the interlocking of the flanges 10 and 11 as hereinbefore described. Any downward pressure in excess of normal is therefore eliminated by the interlocking flanges 10 and 11, which relieve the springs 7 of any excessive pressure, the weight being borne by the plates 8 and 9 and the supports of the plate 8.

Having thus fully described my invention, what I claim as new and desire to secure by United States Letters Patent, is:—

A wheel comprising a hub, spokes radiating from said hub, a felly at the outer ends of said spokes, blocks supported on the felly, arcuate plates attached to the side edges of the felly and extending outwardly therefrom, inturned flanges at the outer edges of the plates, springs supported on the blocks, a rim supported on the outer ends of the springs, arcuate plates attached to the rim and extending inwardly therefrom, inturned flanges on the extreme inner ends of the plates forming shoulders engaging the inner side of the rim, right angularly extending flanges formed at the extreme inner ends of the last mentioned flanges and projecting inwardly to a point intermediate the flanges on the first mentioned plates and the felly, the said flanges on the first mentioned plates frictionally engaging the right angularly extending portion to form dust tight joints between the plates on the felly and rim, and outturned flanges on the right angularly extending portion for engaging the inner sides of the inturned flanges on the felly to limit the outward movement of the rim with relation to the felly.

In testimony whereof I affix my signature.

GEORGE PICKERING.